June 30, 1936.  H. RUPPE  2,045,729
SMALL ELECTRIC MOTOR
Filed April 15, 1935
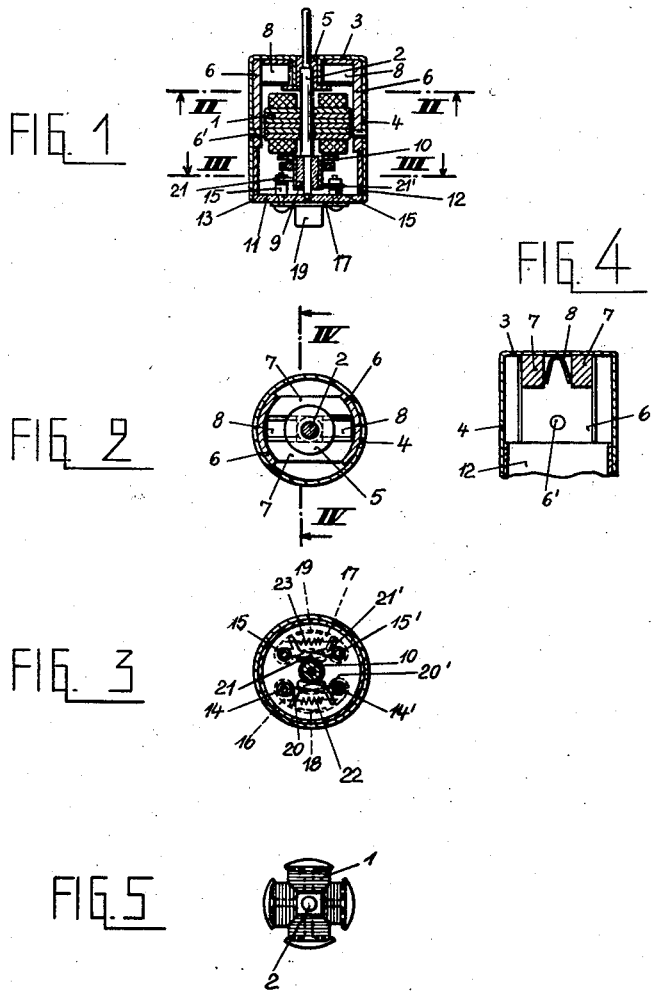

Patented June 30, 1936

2,045,729

UNITED STATES PATENT OFFICE 2,045,729

SMALL ELECTRIC MOTOR

Hugo Ruppe, Berlin, Germany, assignor to Ernst Gross, Berlin, Germany

Application April 15, 1935, Serial No. 16,529
In Germany July 12, 1934

12 Claims. (Cl. 172—36)

My invention relates to electric motors of the smallest kind which are known as "fractional H. P. motors", and more particularly to motors equipped with a permanent field magnet. Such motors may be supplied with current from a battery for electric pocket lamps or torches.

It is an object of my invention to so design a motor of the type referred to, that the field of its permanent magnet is similar to the field of a pot-shaped magnet, and that the parts of expensive high-class material, such as high-class magnet steel, cobalt steel, aluminium nickel steel, etc., which are required for the permanent magnet, are very small, so that the motor is cheap in proportion.

To this end, I provide a permanent field magnet which is built up so as to include a pair of pole pieces arranged at opposite sides of the motor armature or rotor, and not less than one stay which is inserted between the pole pieces at one of their ends for connecting them. This stay, or a pair of such stays, as will be described, is, or are, made of one of the aforesaid high-class magnetic materials, and the section of the stay, or stays is very small so that the amount of expensive material required is small in proportion.

In a preferred embodiment of my invention, I provide a casing or cup made of non-magnetizable material, for instance, brass or molded insulating material, in which the armature of the motor is mounted to rotate on a suitable shaft. On the inner wall of this casing or cup, I arrange, and preferably secure, two sector-shaped pole pieces of soft iron, and insert not less than one of the said stays between the pole pieces. While the length of the pole pieces is determined by the length of the armature, the length of the stay, or stays, is independent thereof so that, in view of the small section, the volume of the stay, or stays, is a minimum.

A built-up field magnet of the kind described, with the stays at one end of its pole pieces, has a field which is similar to that of a pot-shaped magnet, while at the same time it is very small and light for a given performance, and requires very little space. The use of high-class material for the stay, or stays, does not appreciably increase the price of the motor, as explained.

With a built-up field magnet, as described, the diameter of the armature is a maximum for a given outside diameter of the motor casing, and the path of the lines of force has minimum length.

On account of its design, the small motor according to my invention has an extraordinarily high electric efficiency so that its current consumption is low. If supplied with current from a lamp battery, it develops quite a considerable power for several hours and may therefore be used for a great variety of purposes, for instance, the operation of pocket fans, toys, etc.

It is another object of my invention to provide improved means for supplying electric energy to the armature of my motor. To this end, I provide a collector on the motor shaft which is subdivided into segments, and not less than a pair of contacting levers for each pole of the motor. Each contacting lever is mounted to turn about a pivot of its own and springs are provided for holding each lever of a pair against the collector at a point which is spaced from the point where the other lever of the pair engages the collector, so that the circuit is not broken when one of the levers bears against an insulating strip between two segments, as at least one of the levers for each pole is on a segment of the collector at the time.

In the accompanying drawing, a motor embodying my invention is illustrated by way of example and at its actual size.

In the drawing—

Fig. 1 is an axial section of the motor,

Figs. 2 and 3 are sections on the lines II—II and III—III, respectively, in Fig. 1, Fig. 4 is a section on the line IV—IV in Fig. 2, and—

Fig. 5 is a plan view of the armature.

Referring now to the drawing, the armature 1, of usual design, is keyed on a shaft 2. The upper end of the shaft on which a suitable pulley or the like, not shown, may be secured is mounted for rotation in the top plate 3 of a cup or casing 4, preferably in a bearing 5 of molded insulating material. The cup may be of metal or alloy, for instance, brass or some other non-magnetic material, or it may be of molded insulating material. Two sector-shaped pole pieces 6, of soft iron, are secured to the inner wall of cup 4, for instance, by rivets 6'. The upper ends of the pole pieces 6 are abutted against the top plate 3 from below and the pole pieces extend downwardly in the cup 4 for a distance corresponding to the length of armature 1.

The two pole pieces 6 are connected by two stays or bars 7, as best seen in Figs. 2 and 4. A single stay might be provided instead of two parallel stays at opposite sides of the shaft 2, as illustrated. The two stays 7, of small sections and made of high-class magnetic material, as stated above, bear against the two pole pieces 6 at the upper ends of the pieces and are forced apart by elastic means such as a pair of V-shaped plate springs 8 of brass or other non-magnetic material. The stays 7 are arranged on parallel chords of the circular casing or cup 4, as best seen in Fig. 2, and the springs 8 force the stays against the inner faces of the pole pieces which they engage like wedges. Extra means for securing the stays 7 to the pole pieces 6 are not required.

The armature 1, as shown in Fig. 1, rotates between the pole pieces 6. Below the armature, a collector, subdivided into four segments 10, is mounted on the shaft 2 by means of an insulating sleeve 9.

The lower end of shaft 2 is mounted in a step bearing at the centre of a base plate 11, of molded insulating material, press span, or the like. A distance tube 12 which may be of brass or other non-magnetic material, is inserted between the lower ends of pole pieces 6, and the top of base plate 11. The base plate is held by beading, or rolling, over the edge of the cup 4, as shown at 13.

The means for supplying electric energy to the armature 1 will now be described. Secured in the base plate 11 are two pairs of pivots 14, 14' and 15, 15'. The pivots 15 and 15' are connected by a terminal plate 17, and the pivots 14 and 14' are connected by a terminal plate 16. The terminal plates 16 and 17 have depending lugs 18 and 19, respectively, for connecting thereto the wires, not shown, of a battery, not shown.

The contacting levers 20 and 20' of the first pair are mounted to turn on the pivots 14 and 14', respectively, and, through lug 18 and terminal plate 16, are connected to one pole of the battery. Similarly, the levers 21 and 21' of the other pair are mounted on pivots 15 and 15', respectively, and, through lug 19 and terminal plate 18, are connected to the other pole. Each contacting lever has a short arm. The short arms of pair 20, 20' are connected by a spring 22, and the short arms of pair 21, 21' are connected by a spring 23. The springs force the free ends of the corresponding contacting levers against the segments 10 of the collector, and the pivots 14, 14' and 15, 15' are so arranged on the base plate 11 that the free ends of the contacting levers engage the collector segments at distinct and juxtaposed points and, when an insulating strip moves through between the free ends of the levers and the conducting connection of one of the levers to the collector is broken, the other lever of each pair is still on the segment, and the circuit is never interrupted.

With the described arrangement of contacting levers, current is reliably transmitted even if the pressure the free ends of the levers exert on the collector segments, is quite low.

I may arrange any number of superimposed contacting levers on each pivot 14, 14', or 15, 15'.

I claim:

1. In a small electric motor, a casing of non-magnetic material, an armature mounted in said casing to rotate therein, means for supplying electric energy to said armature, a built-up permanent field magnet arranged in said casing for cooperation with said armature and including a pair of pole pieces at opposite sides of said armature, bars inserted between said pole pieces at one of their ends for connecting the pole pieces, and a spring of non-magnetic material for holding assembled said pole pieces and said bars.

2. In a small electric motor, a casing of non-magnetic material, a shaft mounted to rotate in said casing, an armature on said shaft, means for supplying electric energy to said armature, a built-up permanent field magnet arranged in said casing for cooperation with said armature and including a pair of pole pieces at opposite sides of said armature, a pair of bars inserted between said pole pieces at one of their ends and at opposite sides of said shaft, for connecting the pole pieces, and elastic, non-magnetic means for holding said bars against said pole pieces.

3. In a small electric motor, a casing of non-magnetic material, a shaft mounted to rotate in said casing, an armature on said shaft, means for supplying electric energy to said armature, a built-up permanent field magnet arranged in said casing for cooperation with said armature and including a pair of pole pieces at opposite sides of said armature, a pair of bars inserted between said pole pieces at one of their ends and at opposite sides of said shaft, for connecting the pole pieces, and V-shaped springs of non-magnetic material for holding said bars against said pole pieces.

4. In a small electric motor, a casing of circular cross section and of non-magnetic material, a shaft mounted to rotate in the axis of said casing, an armature on said shaft, means for supplying electric energy to said armature, a built-up permanent field magnet arranged in said casing for cooperation with said armature and including a pair of pole pieces each curved to an arc of a circle about the axis of said casing, a pair of bars inserted between said pole pieces at one of their ends and arranged on parallel chords of said circular cross section at opposite sides of said shaft, for connecting the pole pieces, and elastic means of non-magnetic material inserted between said bars so as to force them apart and to wedge their ends against the inner faces of said pole pieces.

5. In a small electric motor, a cup-shaped casing of non-magnetic material, a bearing in the top plate of said cup-shaped casing, a base plate at the open end of said casing, a bearing in said base plate in line with the bearing in the top plate, a shaft mounted to rotate in said bearings, an armature on said shaft, means for supplying electric energy to said armature, a built-up permanent field magnet arranged in said cup-shaped casing for cooperation with said armature and including a pair of pole pieces at opposite sides of said armature, a pair of bars inserted between said pole pieces at one of their ends and at opposite sides of said shaft, for connecting the pole pieces, and elastic, non-magnetic means for holding said bars against said pole pieces.

6. In a small electric motor, a cup-shaped casing of non-magnetic material, a bearing in the top plate of said cup-shaped casing, a base plate at the open end of said casing, a bearing in said base plate in line with the bearing in said top plate, a shaft mounted to rotate in said bearings, an armature on said shaft, means for supplying electric energy to said armature, a built-up permanent field magnet arranged in said cup-shaped casing for cooperation with said armature, and including a pair of pole pieces at opposite sides of said armature, a pair of bars inserted between said pole pieces at one of their ends and at opposite sides of said shaft, for connecting the pole pieces, elastic, non-magnetic means for holding said bars against said pole pieces, and a distance tube inserted in said casing between said base plate and said pole pieces.

7. In a small electric motor, a casing of non-magnetic material, a shaft mounted to rotate in said casing, an armature on said shaft, a collecter on said shaft including insulated segments, a pair of fixed pivots for each pole of the motor, a contacting lever mounted to turn on each pivot, the pivots of each pair being so positioned that the contacting lever of one pivot in each pair engages said collector at a point which is juxtaposed with respect to the point of contact of the lever on the other pivot, elastic means for holding said levers against said collector, a built-up permanent field magnet arranged in said casing for cooperation with said armature and including a pair of pole pieces at opposiite sides of said armature, a bar inserted between said pole pieces at one of their ends for connecting the pole pieces, and means for holding assembled said pole pieces and said bar.

8. In a small electric motor, a casing of non-magnetic material, a shaft mounted to rotate in said casing, an armature on said shaft, a collector on said shaft including insulated segments, a pair of fixed pivots for each pole of the motor, a terminal plate connecting the pivots of each pair, a contacting lever mounted to turn on each pivot, the pivots of each pair being so positioned that the contacting lever of one pivot in each pair engages said collector at a point which is juxtaposed with respect to the point of contact of the lever on the other pivot, a spring connected to the levers of each pair for holding said levers against said collector, a built-up permanent field magnet arranged in said casing for cooperation with said armature and including a pair of pole pieces at opposite sides of said armature, a bar inserted between said pole pieces at one of their ends for connecting the pole pieces, and means for holding assembled said pole pieces and said bar.

9. A small electric motor as claimed in claim 2 characterized in that said bars are disposed in a plane at right angles to the axis of rotation of said armature.

10. A small electric motor as claimed in claim 7 characterized in that the points of engagement of the contacting levers of each pair of pivots with the collector are relatively displaced in the direction of rotation of the armature.

11. A small electric motor as claimed in claim 7 characterized by the provision of a strip connecting the pivots of each pair.

12. A small electric motor as claimed in claim 5 characterized in that said base plate is formed of plastic material.

HUGO RÜPPE.